(12) United States Patent
Ilves et al.

(10) Patent No.: US 6,294,104 B1
(45) Date of Patent: Sep. 25, 2001

(54) LIQUID FOR THE PREVENTION OF FREEZING OF AIRCRAFTS AND RUNWAYS

(75) Inventors: Antti Ilves, Porvoo; Heikki Reijonen, Espoo; Jukka-Pekka Nieminen, Porvoo, all of (FI)

(73) Assignee: Fortum Power and Heat Oy, Fortum (FI)

( * ) Notice: Subject to any disclaimer, the term of this patent is extended or adjusted under 35 U.S.C. 154(b) by 0 days.

(21) Appl. No.: 09/486,366

(22) PCT Filed: Aug. 26, 1998

(86) PCT No.: PCT/FI98/00663

§ 371 Date: Apr. 6, 2000

§ 102(e) Date: Apr. 6, 2000

(87) PCT Pub. No.: WO99/11729

PCT Pub. Date: Mar. 11, 1999

(30) Foreign Application Priority Data

Aug. 29, 1997 (FI) ......................................... 973552

(51) Int. Cl.⁷ ....................................................... C09K 3/18
(52) U.S. Cl. .................................. 252/70; 106/13
(58) Field of Search ................... 252/70; 106/13

(56) References Cited

U.S. PATENT DOCUMENTS

| 4,155,891 | 5/1979 | Pettelkau et al. ..................... 524/217 |
| 5,079,036 | 1/1992 | Roe et al. ............................. 427/212 |
| 5,118,435 | 6/1992 | Nieh et al. .............................. 252/70 |
| 5,993,684 | * 11/1999 | Back et al. . |
| 6,165,380 | * 12/2000 | Ilves et al. ............................. 252/70 |

FOREIGN PATENT DOCUMENTS

| 0743305 | 11/1996 | (EP) . |
| 99260 | 10/1997 | (FI) . |
| 1664808 | 7/1991 | (SU) . |
| 97031988 | 9/1997 | (WO) . |

* cited by examiner

Primary Examiner—Anthony Green
(74) Attorney, Agent, or Firm—Birch, Stewart, Kolasch & Birch, LLP

(57) ABSTRACT

The present invention relates to an environmentally friendly liquid for the prevention of freezing of aircrafts and runways, said liquid being particularly suitable to various spraying equipments. The vapor pressure of the said liquid is less than 5 Pa, and the acute oral toxicity, $LD_{50}$, is more than 10 000 mg/kg. This anti-freezing liquid comprises 10–60 wt. % trimethyl glycin or derivatives thereof, and 40–90 wt. % water, and optionally additives known for anti-freezing liquids.

19 Claims, No Drawings

LIQUID FOR THE PREVENTION OF FREEZING OF AIRCRAFTS AND RUNWAYS

This application is the national phase under 35 U.S.C. §371 of PCT International Application No. PCT/FI98/00663 under which has an International filing date of Aug. 26, 1998, which designated the United States of America.

The present invention relates to an environmentally friendly liquid for the prevention of freezing of aircrafts and runways, said liquid being particularly suitable to various spraying equipments.

The prevention of the formation of ice of ice onto aircrafts and runways, as well as ice removal is commonly accomplished with several anti-freezing chemicals to ensure a safe take-off, landing, and flight, particularly in the wintertime. These anti-freezing agents are generally ethylene or propylene glycol based sprayable solutions or foams, if necessary mixed with thickening agents to increase the viscosity, water, surface active agents, and corrosion inhibitors. Such ethylene or propylene glycol based anti-freezing agents are toxic, polluting the environment as they are flushed into the earth. Further, an unpleasant odor is released therefrom into and carried by air currents. Such anti-freezing agents may also cause corrosion problems. The anti-freezing agents commonly sprayed onto aircrafts generally contain at least 60% glycol, normally ethylene glycol, or a mixture of other glycols.

The function of the anti-freezing agent is to remove snow, ice and hoarfrost from the surface of the aircraft that have formed as the aircraft stays at the airport. The snow, ice and hoarfrost freezed on the aircraft significantly influence the aerodynamic properties, and the performance of the engines thereof, eventually leading to dangerous situations, for instance during take-off of the machine. For this reason the machines are always checked before the departure to make sure they are free from ice, snow and hoarfrost.

The prevention of freezing of the runways and ice removal therefrom include the use of anti-freezing chemicals. The main function of these chemicals is to diffuse through the snow and ice already formed to weaken the bonding therein, allowing them to be much more easily removed by mechanical means. In addition, anti-freezing chemicals are used in conditions where water and snow may freeze on the runway.

The SU patent publication No 1664808 discloses a composition useful for the prevention of freezing, and for thawing powdered or granular materials like flour, sand, or any of the kind. This composition comprises magnesium or calcium chloride, ammonia, carbohydrates, glycerin, lactic acid, volatile acids, betaine, amino acids, fatty compounds, as well as water. The purpose of this composition is to prevent the freezing of the powdered material, particularly during transport thereof, on the walls and bottom of the container, and the aggregation thereof, as well as to thaw the material already frozen.

The US patent publication No 5079036 describes and anti-freezing composition for the prevention of freezing and aggregation of a solid granular material like mineral coat or one during handling and transport thereof at a temperature below 0° C. This composition forms a foam onto the solid particles. It comprises a solution suitable as an anti-freezing agent, such as of salts like sodium chloride, potassium chloride, magnesium chloride, cassium chloride, or of polyhydroxy compounds or monoaklyl ethers or dialkyl ethers, such as ethylene and propylene glycols, glycerol, sugar and mixtures thereof. Further, cellulose derivatives, for instance sodium carboxymethyl cellulose and ethyl hydroxyethyl cellulose are mentioned as suitable anti-freezing agents. Besides this anti-freezing agent the composition includes an anionic or amphoteric surface active agent allowing the formation of a stable foam. For this purpose suitable compounds are such anionic surface active agents as sulphonates, and such amphoteric surface active agents as the derivatives of betaine, among others. In addition, the composition contains water.

The European patent publication 743305 discloses an anti-freezing composition. particularly for the prevention of freezing of aircrafts and the wings thereof. This publication presents a novel surface active agent, namely a polyether amide, that may be used in combination with alkylen glycol based anti-freezing agents, using polyacryl acids as thickeners. Moreover, said compositions typically comprise a corrosion inhibitor, optionally an amine, potassium hydroxide or alkalimetal hydroxide, and water.

Most common water based anti-freezing liquids are typically aqueous mixtures of ethylene and propylent glycols, and water. Particularly, ethyl glycol is used in various applications of the automobile industry. Disadvantages of ethylene glycol are, however, the toxicity, and the polluting character thereof. Accordingly, propylene glycol is often used instead of ethylene glycol in applications where a lower toxicity if required. Although propylene glycol is relatively nontoxic, it is, however, also environmentally questionable. Another drawback of propylene glycol is that the viscosity thereof increases significantly at low temperatures, making a higher pumping power necessary.

Compared to ethylene glycol, the lower toxicity of ethanol makes its use more attractive. The use of ethanol is, however, limited by the high volatility, and as a consequence the liability thereof to catch fire, as well as by the great viscosity increase at low temperatures, this viscosity increase being, however, less significant than with propylene glycols. For this reason, ethanol is widely used as a cooling liquid in laboratories and in situations where nontoxicity is required.

Corrosion, particularly when using glycols, makes the search for expensive and effective corrosion inhibitors indispensable. The compositions and concentrations of corrosion inhibitors are difficult to control. Generally, as a result of an effective inhibitor a liquid with a very low toxicity becomes toxic. Normally, complex solutions make the final liquid more expensive.

An object of the present invention is to provide an anti-freezing liquid particularly useful for the prevention of freezing of aircrafts and runways, and the equipment therefor, and by means of which it is possible to solve the problems associated with the state of the art, and to eliminate disadvantages thereof.

Further, an object of the invention is to provide an anti-freezing liquid suitable for aircrafts and runways, the use thereof being environmentally safe and economical as well as without any risk to the health.

The anti-freezing liquid for aircrafts and runways of the invention is characterized in the appended claims.

According to the invention the preferable compound useful as a component of the said anti-freezing liquid for aircrafts and runways is trimethyl glycine, or the salts of trimethyl glycine hydrate. Trimethyl glycine, or betaine, is particularly preferable. Betaine may for instance be prepared by extracting from natural products such as from sugar beets, or by a biochemical process thus allowing the production of a biological anti-freezing liquid with a favorable life cycle.

The liquid used for the prevention of freezing of the aircrafts and runways according to the invention contains 10–60% trimethyl glycine or a derivative thereof, and 40–90% water; preferably 40–55% trimethyl glycine or a derivative thereof, and 45–60% water, all percentages being by weight.

Among the advantages of this anti-freezing liquid are the nontoxicity and safety thereof, and the lack of odor. Several of its physical properties are the same as with glycol solutions, and it may be used at temperatures between −50° and +100° C. It is preferably used at temperatures ranging from −40° C. to +80° C. A characteristic of the anti-freezing chemicals is that they lower the freezing temperature. This freezing temperature should be no higher than −20° C., with betaine a freezing temperature as low as −50° C. may even be attained.

If necessary or desired, the anti-freezing liquid of the invention may be combined with conventional corrosion inhibitors, stabilizing and marker agents, thickeners, surface active agents, other anti-freezes like glycols and salts, as well as compounds for controlling the acidity, all of them well known in the art.

The anti-freezing liquid of the present invention is less toxic and less polluting than the anti-freezing liquids already known in the art. Said liquid is not classified as a hazardous waster, and it may be disposed of easily, thus lowering the costs. The waste liquid may be handled without any special measures, it may be absorbed into the earth, or drained into the sewer, wherein ethylene and propylene glycols, as well as ethanol commonly used in the state of the art must be disposed of in a special way as hazardous wastes.

The anti-freezing liquid according to the present invention is suitable for various applications for the prevention of freezing of, or for ice removal from aircrafts, runways, and the like, particularly at low temperatures an in situations where the liquid must be environmentally friendly and nontoxic.

The evaluation of the toxicity of the compounds is based on the $LD_{50}$ values from the literature. The $LD_{50}$ values used are tested orally in rats. The results are shown below in Table I.

TABLE I

| Compound | $LD_{50}$/mg/kg |
|---|---|
| Ethylene glycol | 4700 |
| Propylene glycol | 20000 |
| Ethanol | 7060 |
| Trimethyl glycine | 11179 |

In table II the kinematic viscosities of the liquids are compared at the concentration of 50%.

TABLE II

| Solution | Concentration % by weight | Kinematic viscosity, mm²/s | | | |
|---|---|---|---|---|---|
| Temperature | | 20° C. | 0° C. | −10° C. | −20° C. |
| Ethylene glycol | 50 | 3.48 | 7.40 | 11.7 | 19.6 |
| Propylene glycol | 50 | 6.44 | 18.70 | 38 | 87 |
| Ethanol | 50 | 3.10 | 7.22 | 12.20 | 23 |
| Trimethyl glycine | 50 | 5.90 | 12.80 | 21.50 | 38 |

Table III illustrates how different compounds decrease the freezing point of a 50% solution.

TABLE III

| Liquid | Freezing point of a 50% solution, ° C. |
|---|---|
| Ethylene glycol | −35 |
| Propylene glycol | −34 |
| Ethanol | −38 |
| Trimethyl glycine | −42 |

The following Table IV shows the effect of trimethyl glycine on the freezing point of aqueous solutions.

TABLE IV

| Concentration of trimethyl glycine % by weight | Freezing point, ° C. |
|---|---|
| 10 | −2.1 |
| 20 | −5.1 |
| 25 | −7.2 |
| 30 | −10.7 |
| 35 | −15 |
| 50 | −38 |

The surface tensions of typical anti-freezing agents are presented below in Table V. The surface tension of trimethyl glycine is comparable to that of water, and higher than with glycols.

TABLE V

| Solution | Surface tension, mN/m |
|---|---|
| Water | 72 |
| Ethylene glycol (50 wt-%) | 55 |
| Propylene glycol (50 wt-%) | 45 |
| Trimethyl glycine solution (50 wt-%) | 76 |

Table VI shows the vapor pressures of several anti-freezing liquids at 37.8° C. Since the vapor pressure of the trimethyl glycine solution is lower than with other solutions, it is not evaporated/volatilized so easily by an air stream.

TABLE VI

| Solution | Vapor pressure, Pa (T = 37,8° C.) |
|---|---|
| Water | 6.1 |
| Ethylene glycol (50 wt-%) | 5.5 |
| Propylene glycol (50 wt-%) | 5.2 |
| Trimethyl glycine solution (50 wt-%) | 4.1 |

The liquid according to the present invention containing 10–60% trimethyl glycine or derivatives thereof, and 40–90% water, by weight, is applicable to the anti-freezing systems for aircrafts and runways, particularly for spraying onto the surface desired.

The vapor pressure of the liquid of the invention is below 5 Pa. $LD_{50}$ value is more than 10 000 mg/kg (orally in rats), and the flash point thereof if above 100° C. Further, the freezing point of a 50% solution is less than −38° C., the surface tension thereof being more than 55 dyn/cm. Its storage life in standardized conditions, at room temperature, is more than 2 years. The viscosity, an important characteristic of an anti-freezing liquid, may be stably adjusted to a desired range.

Trimethyl glycine is a nontoxic and odorless raw material from the nature that biodegrades in the nature to 80% in 20 days. The slow biodegradation is a problem associated for instance with propylene glycols used formerly. Trimethyl glycine lowers the freezing point of water, the heat transfer properties thereof are excellent, unpleasant odors are not released from it, and it may be used without any corrosion inhibitors to prevent corrosion since it is as such only weakly corrosive. For example of corrosion of copper allows is clearly below 1 μm/year when the liquids according to this invention are used. Further, they do not corrode polycarbonate acryl, or painted surfaces.

The glycols previously used as anti-freezes are harmful to the sealing materials present in aircraft structures, whereas anti-freezing liquids based on trimethyl glycine are free of such negative effects. The recovery of the anti-freezing liquids containing glycols from the airports for the disposal, or reuse thereof is very complicated, the complete recovery being anyway impossible. The trimethyl glycine solutions need not to be recovered since they degrade quickly in the nature. The handling of the trimethyl glycol solutions is safe because of the low vapor pressures, and accordingly the low volatilities thereof. On the contrary, for instance for ethylene glycol a limiting vapor pressure of 50 ppm (TVL) is determined for safety reasons. The safety to the environment is to mentioned as one of the major advantages of using trimethyl glycine solution as a liquid for the prevention of freezing of aircrafts and runways.

The invention is described above with reference only to some preferable examples thereof, the details of which should not, however, be considered as narrowly limiting the invention. Many modifications and variations are possible within the scope and spirit of the invention defined in the appended claims.

What is claimed is:

1. An anti-freezing liquid for aircrafts and runways, wherein the vapor pressure of the said liquid if less than 5 Pa and the acute oral toxicity, $LD_{50}$, in rats is more than 10 000 mg/kg, and said liquid's freezing point of a 50% liquid is below −38° C.

2. The liquid according to claim 1, wherein said liquid's freezing point of a 35% liquid is −15° C. or below −15° C.

3. The liquid according to claim 1, wherein said liquid's surface tension of a50% liquid is more than 55 dyn/cm.

4. The liquid according to claim 1, wherein the liquid comprises 10–60 wt- % trimethyl glycine or derivative thereof, and 40–90 wt- % water.

5. The liquid according to claim 1, wherein the liquid comprises 40–55 wt- % trimethyl glycine or derivatives thereof, and 45–60 wt- % water.

6. The liquid according to claim 1, wherein the liquid comprises trimethyl glycine from a biological source, or derivatives thereof.

7. The liquid according to claim 1, wherein said anti-freezing liquid is used at a temperature ranging between −50 and +100° C.

8. The liquid according to claim 1, wherein the liquid comprises as additives corrosion inhibitors, stabilizers, markers, thickeners, surface active agents, other anti-freezes, or compounds for controlling the acidity.

9. The liquid according to claim 1, wherein said anti-freezing liquid is used at a temperature ranging between −40 and +80° C.

10. The method of preventing freezing of aircrafts and runways, comprising the step of applying a liquid comprising 10–60 wt- % trimethyl glycine or derivatives thereof, and 40–90 wt- % water to said aircraft or said runway.

11. A method of preventing freezing of aircrafts and runways, comprising the step of applying a liquid to said aircraft or said runway, wherein the vapor pressure of said liquid is less than 5 Pa and the acute oral toxicity, $LD_{50}$, in rats is more than 10 000 mg/kg, and said liquid's freezing point of a 50% liquid is below −38° C.

12. A method of preventing freezing of aircrafts and runways according to claim 11, comprising the step of applying the liquid having a freezing point of a 35% liquid that is 31 15° C. or below −15° C.

13. A method of preventing freezing of aircrafts and runways according to claim 11, by applying the liquid to said aircraft or said runway wherein said liquid's surface tension of a 50% liquid is more than 55 dyn/cm.

14. A method of preventing freezing of aircrafts and runways according to claim 11, by applying the liquid to said aircraft or said runway wherein the liquid comprises 10–60 wt- % trimethyl glycine or derivatives thereof, and 40–90 wt- % water.

15. A method of preventing freezing of aircrafts and runways according to claim 11, by applying a liquid to said aircraft or said runway wherein the liquid comprises 40–55 wt- % trimethyl glycine or derivatives thereof, and 45–60 wt- % water.

16. A method of preventing freezing of aircrafts and runways according to claim 11, by applying a liquid to said aircraft or said runway wherein the liquid comprises trimethyl glycine from a biological source, or derivatives thereof.

17. A method of preventing freezing of aircrafts and runways according to claim 11, by applying a liquid to said aircraft or said runway wherein said anti-freezing liquid is used at a temperature ranging between −50° and +100° C.

18. A method of preventing freezing of aircrafts and runways according to claim 11, by applying a liquid to said aircraft or said runway wherein the liquid comprises as additives corrosion inhibitors, stablizers, markers, thickeners, surface active agents, other anti-freezes, or compounds for controlling the acidity.

19. A method of preventing freezing of aircrafts and runways according to claim 11, by applying a liquid to said aircraft or said runway wherein said anti-freezing liquid is used at a temperature ranging between −40° and +80° C.

* * * * *